United States Patent [19]

Griesemer

[11] Patent Number: 4,818,023

[45] Date of Patent: Apr. 4, 1989

[54] DEVICE FOR INCREMENTAL ADJUSTMENT OF THE HEIGHT OF A SECURING POINT OR RETURN-TRAVEL POINT FOR A SAFETY BELT OR THE LIKE

[76] Inventor: Albert Griesemer, Dorfwiese 3-D-5438, Westerburg-Gershasen, Fed. Rep. of Germany

[21] Appl. No.: 124,850
[22] PCT Filed: Jan. 24, 1987
[86] PCT No.: PCT/EP87/00032
§ 371 Date: Sep. 30, 1987
§ 102(e) Date: Sep. 30, 1987
[87] PCT Pub. No.: WO87/04674
PCT Pub. Date: Aug. 13, 1987

[30] Foreign Application Priority Data

Feb. 1, 1986 [DE] Fed. Rep. of Germany ....... 3603140

[51] Int. Cl.[4] .............................................. B60R 21/10
[52] U.S. Cl. ...................................... 297/483; 280/808; 297/468
[58] Field of Search ................ 297/483, 468; 280/808

[56] References Cited

U.S. PATENT DOCUMENTS

| 4,552,408 | 11/1985 | Ono ................................ 280/808 X |
| 4,597,588 | 7/1986 | Kawai .............................. 280/808 |
| 4,640,550 | 2/1987 | Hakansson ....................... 280/808 |

FOREIGN PATENT DOCUMENTS

| 0127690 | 6/1983 | European Pat. Off. . |
| 0104620 | 4/1984 | European Pat. Off. . |
| 2303222 | 8/1974 | Fed. Rep. of Germany . |
| 3136475 | 6/1982 | Fed. Rep. of Germany . |
| 3413084 | 10/1984 | Fed. Rep. of Germany . |
| 3400214 | 6/1986 | Fed. Rep. of Germany . |
| 0144361 | 10/1980 | German Democratic Rep. ................................ 280/808 |

Primary Examiner—James T. McCall
Attorney, Agent, or Firm—Cushman, Darby & Cushman

[57] ABSTRACT

The device consists of a guide strip (1) and a guide sleeve (2) movable along the guide strip (1), said sleeve being if possible, composed of a top section (2a) having a wide side at the front and a bottom section (2b) having a wide side at the rear, and of a spring strip, preferably in the form of a wide leaf spring (8). On the rear broad side of the guide sleeve (2) recesses or engagement lugs (7) are provided, whereas along the axis (3) of the guide strip (1) or symmetrically thereto, corresponding engagement lugs or recesses (4) are arranged. The engagement lugs (7) and recesses (4) mentioned enter into mutual engagement from the rear of the guide strip (1) as soon as they are in register by moving of the guide sleeve (2) on the guide strip (1). They are secured in this locking position by the leaf spring (8). To release, the guide sleeve (2) is pressed in the direction of arrow (10) towards the front face of the guide strip (1), and after this a further sliding movement and height adjustment can be effected. The tractional forces are operative, in the event of loading (collision), in the opposite direction to the arrow (10). The guide sleeve (2) is then in its locked position. It is a device of extremely simple design, safe manipulation and operation, and is very adaptable. Particularly attractive is the securing of a return-travel fitting to a threaded sleeve (12) on the front wide side of the guide sleeve (2).

7 Claims, 7 Drawing Sheets

DEVICE FOR INCREMENTAL ADJUSTMENT OF THE HEIGHT OF A SECURING POINT OR RETURN-TRAVEL POINT FOR A SAFETY BELT OR THE LIKE

FIELD OF THE INVENTION

The invention relates to a device for incrementally adjusting the height of a securing point or a return-travel point for a safety belt or the like, comprising a guide rail and a guide sleeve that is displaceable on the guide rail. Engagement lugs on the one hand and corresponding recesses on the other are provided in such a way that for locking, the guide sleeve can be brought into fixed engagement with the guide rail crosswise to the actual displacement direction. The device also has a spring element, disposed between the guide rail and the guide sleeve, that is intended to keep the guide sleeve in the locking position.

Devices of this kind are used particularly for safety belts in motor vehicles. As is well known, it is conventional to provide a return-travel point on the vehicle support post above the shoulder of the wearer, while the ends of the safety belt as a rule are fixed to the floor of the vehicle, with one end on an automatic winder mechanism. Special return-travel fittings are usually attached to the return-travel point. These fittings are mainly rings, eyes, or the like, together with a screw-insertion piece. For the latter part, a screw thread is then provided on the guide sleeve.

Because the effectiveness of the safety belts depends to a not inconsiderable extent on their anatomically correct placement, which in turn is definitively influenced via the reverse-travel point in accordance with body size and posture, the devices for adjusting the height of the return-travel point become highly significant. There has accordingly been no lack of proposals thus far that describe such devices. However, most of them have the disadvantage of being quite complicated, or not strong enough.

PRIOR ART

Among the relatively simple devices are those defined by the preamble. In a known device of this kind, engagement lugs are provided on one edge of the guide rail, and the guide sleeve has a recess on the same edge, with which it can be moved into the vicinity of an engagement lug, crosswise to the actual displacement direction. When the guide sleeve and guide rail are in engagement, they are further locked by a spring element. The latter is located in the narrow gap between the edge of the guide rail oriented toward the engagement lugs and the corresponding edge of the guide sleeve. Because of its very slight width and its therefore unstable position, the spring element must also be provided with a special insert part. The insert part is preferably made from plastic and serves to guide and retain the spring element. Without this kind of insert part, major malfunctions would have to be expected.

This known device has a number of disadvantages. As noted above, not only the guide rail, guide sleeve and spring element must be provided, but another component made from a different material as well. This naturally makes manufacture and assembly expensive. Since in the load condition (collision) strong lateral traction is also operative, the guide rail must always be mounted only in such a way that the guide sleeve pulls into the edge of the guide rail having the engagement lugs. Assembly accordingly requires particular care. It may also be necessary to provide different guide rails for the left and right sides of the vehicle, one having engagement lugs on the left edge and the other on the right, or in other words to manufacture two different versions. This becomes a particularly important factor if the upper and lower end of the guide rail are embodied differently, for example one having a round hole and the other having an oblong slot, or the like. Finally, it has also been found that this embodiment is incapable of withstanding very high traction. Precisely at the edge provided with engagement lugs and hence with recesses, destruction and breakage in fact occur easily. Evidently, this is a structurally weak point.

Proposals are also already known according to which the guide rails are more uniformly stressed. However, this advantage is attained at the cost of other disadvantages. In one embodiment in current use, in particular, the guide rail has a cross section in the form of a horizontal C, with recesses on both inwardly pointing edges. A slide is displaceable in the guide rail, and a return-travel fitting can be attached to the slide. The slide encloses a nut retainer, a specially shaped nut, a movable retaining element having two engagement lugs for engagement with the recesses of the guide rail, a spring element, and a specialized lever for unlatching the retaining element.

It need not be emphasized that this known embodiment is very labor-intensive and complicated. For one thing, a great number of parts must be manufactured and assembled. The structural height is considerable, and the weight per unit is high. Necessarily, this embodiment is also quite expensive. But the safety it provides, that is, its load capacity, leaves something to be desired. Finally, only two engagement lugs come into engagement, and the inwardly curved edges cannot withstand particularly high traction, particularly where they are weakened by the recesses.

DESCRIPTION OF THE INVENTION

It is the object of the invention to improve a device of the above-described type, with its relatively simple design, still further, and in particular in terms of its load capacity.

This object is attained in accordance with the proposal of the invention in a surprisingly simple manner, in that engagement lugs or recesses are provided on the rear surface of the guide sleeve, and corresponding recesses or engagement lugs are provided on the axis of the guide rail or symmetrically thereto.

Unlike before, the guide sleeve now completely surrounds the substantially flat guide rail on both edges. On the other hand, engagement lugs, protrusions, teeth or the like are located exclusively on the rear surface of the guide sleeve, for engagement with the guide rail, while the guide rail has corresponding recesses on its axis, or symmetrically thereto. The engagement lugs and recesses can also be disposed equally well in reverse order; that is, the engagement lugs can be disposed on the guide rail, and the corresponding recesses can be disposed on the rear surface of the guide sleeve.

If the guide sleeve is pushed with its rear surface against the guide rail and displaced, in the axial direction, the guide sleeve snaps into place at the next opportunity. A spring element locks the guide sleeve in this position. The spring element has a large barring surface and can therefore be selected to be quite wide and to be readily attached. As in the earlier device as well, the location of the guide sleeve and thus its locking position must be selected such that when stressed it remains in the locked position.

Unlike before, the guide rail is now stressed more uniformly. The improved load distribution attainable with the proposed symmetrical design, with the possibility of causing a multiplicity of teeth or the like to enter engagement at the same time, makes substantially greater loads possible. This has been unequivocally proved in corresponding tearing tests.

Advantageously, rectangular recesses or engagement lugs are disposed on both edges of the guide rail.

In another proposal, recess or engagement lugs of round or rectangular cross section are disposed on the axis of the guide rail.

The engagement lugs advantageously have a height equal to approximately the thickness of the guide rail or the thickness of the rear surface of the guide sleeve.

In a further feature of the concept of the invention, the guide sleeve is embodied by an upper part having the front surface and the two edges and a lower part having the rear surface and the engagement lugs or recesses.

Suitably, the spring element is a wide leaf spring with folded-up ends.

BRIEF DESCRIPTION OF THE DRAWING

Further details of the invention are described below for preferred exemplary embodiments, referring to the drawing. Shown are.

According to FIGS. 1–4, a guide sleeve 2 is slipped onto a guide rail 1. In the exemplary embodiment the guide rail 1 is straight and flat and has recesses 4 of rectangular course on its edges, symmetrically with its axis 3. On its ends, the guide rail 1 has a round hole 5 or an oblong hole 6 for securing to the side support post of a motor vehicle. The guide sleeve 2 encompasses the guide rail 1 in such a way that a open cross section exists from one end to the opposite end of the guide sleeve 2, and this open cross section corresponds to the full cross section of the guide rail 1. It is followed in the direction toward the rear surface that is the surface opposite the surface having the threaded sleeve 12, by a cross-sectional enlargement, where engagement lugs 7 or the like are provided. The latter may be moved into the recesses 4 of the guide rail 1 for locking purposes.

The guide sleeve is retained in this locked position by means of a spring element, namely a wide leaf spring 8. The leaf spring 8 is simply inserted between the front surface of the guide sleeve 2 and the guide rail 1, having folded-up ends 9 and thus gripping the guide sleeve 2 without further provisions for that purpose. Because of its curved shape and an initial stress, the guide sleeve 2 remains in firm engagement with the guide rail 1 until such time as a stronger force is exerted upon the guide sleeve 2 in the direction of the arrow 10, whereupon the guide sleeve 2, with its front surface, or with the interposed leaf spring 8 which in that case is then pressed flat, reaches the front side of the guide rail 1. In this position, its displacement position, the guide sleeve 2 can easily be moved upward and downward in the direction of the double arrow 11, to adjust the height of the return-travel fitting to a more favorable level as needed. If pressure is no longer exterted upon the guide sleeve 2 in the direction of the arrow 10 and the engagement lugs 7 have come to coincide with the recesses 4, then a return of the guide sleeve 2 takes place, under the influence of the leaf spring 8, into the locking position shown in FIGS. 1–4.

As also apparent from the drawings, a threaded sleeve 12 is provided on the front surface of the guide sleeve 2, as a means for fastening a return-travel fitting, not shown in detail here. In case of a collision, traction in the opposite direction of the arrow 10 becomes operative at the guide sleeve 2, so that the guide sleeve 2 cannot move out of its locked position. Instead, with this favorable form-locking engagement, considerable force can be transmitted from the guide sleeve 2 onto the guide rail 1.

For manufacturing reasons, the guide sleeve 2 may be made of an upper part 2a (having the front surface and the two edges) and a lower part 2b (having the rear surface and the engagement lugs 7). Both parts may in particular be welded to one another. This design, already shown in FIGS. 1–4, is also assumed in the further exemplary embodiments, not least because it enables the essence of the invention to be illustrated particularly clearly.

Figure 1:
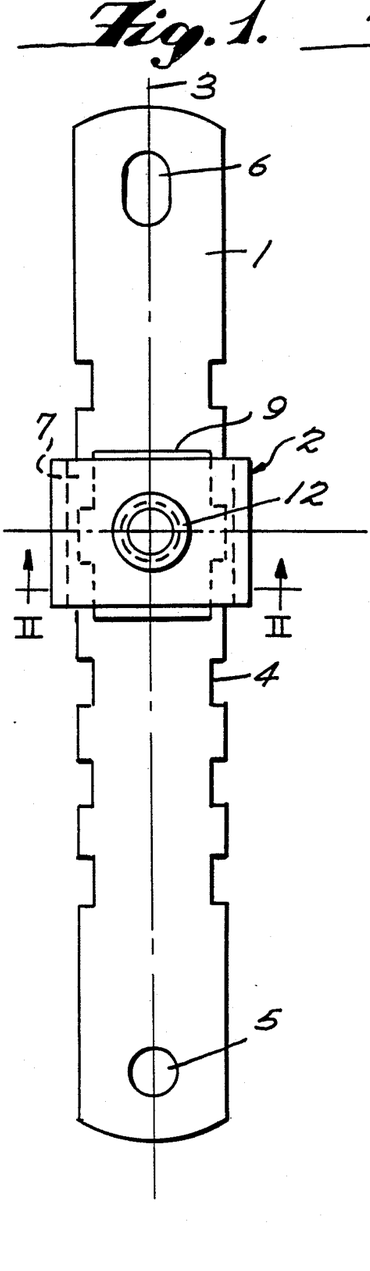
FIG. 1, a device according to the invention in plan view.
Figures 2, 3, 4:
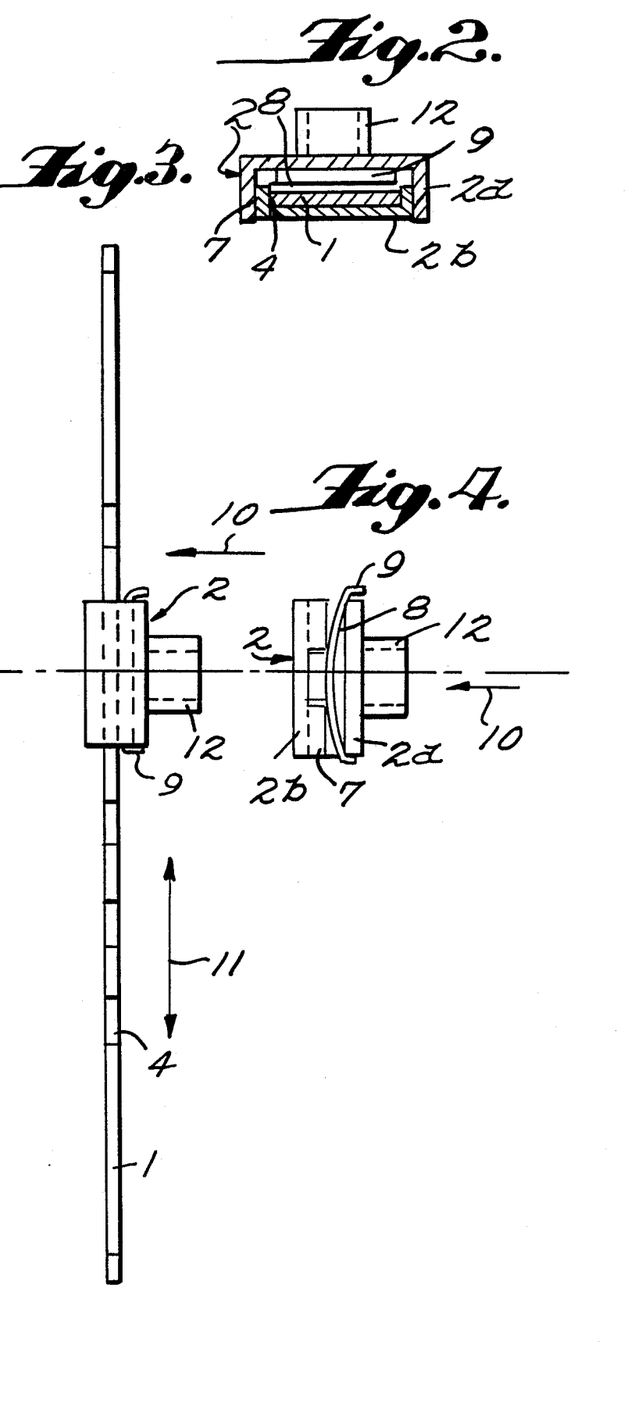
FIG. 2, the device of FIG. 1 in a section taken along the line II—II.
FIG. 3, the device of FIG. 1 in a side view.
FIG. 4, the guide sleeve of FIG. 3, partially cut away.
Figure 5:
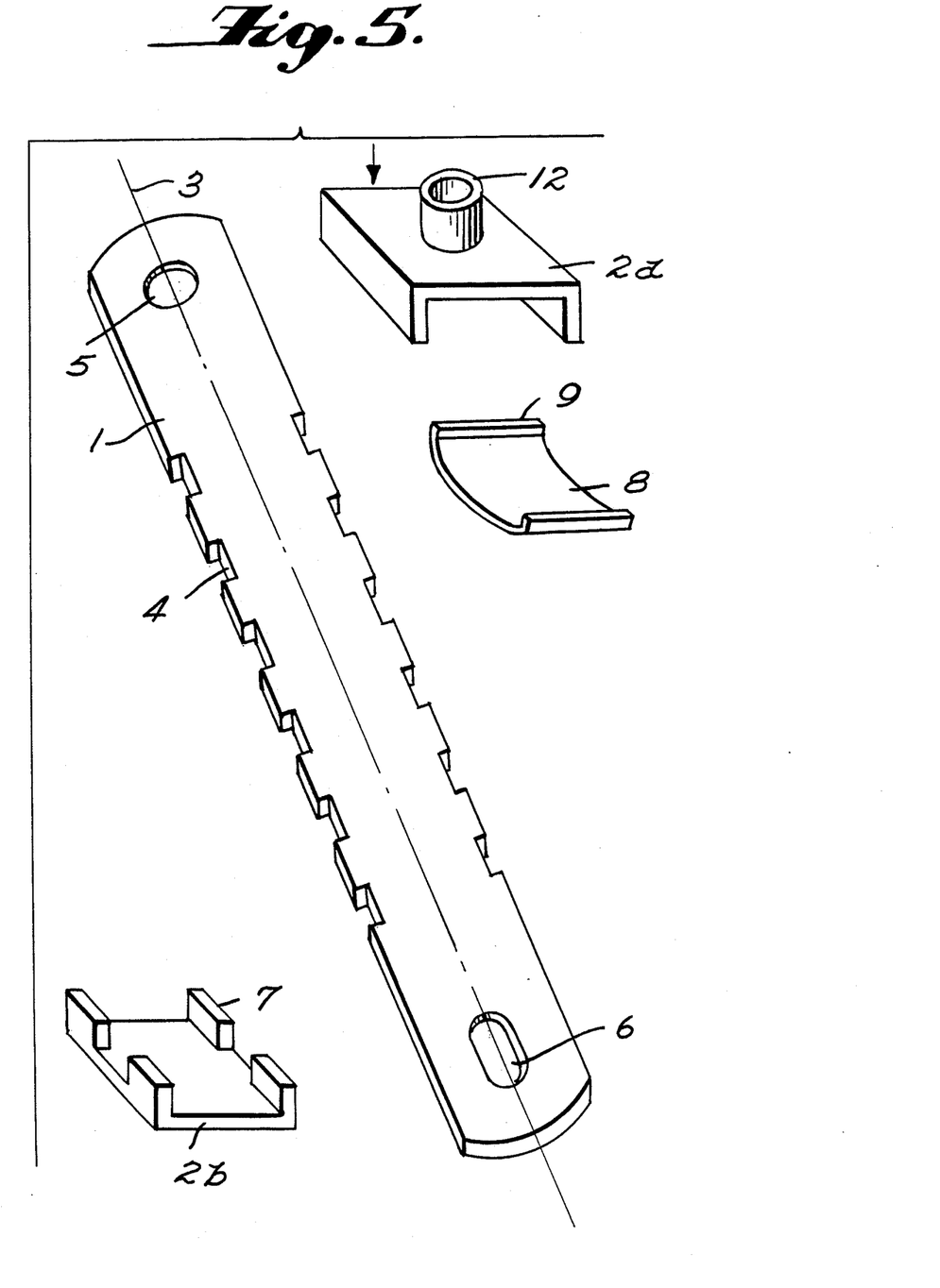
FIG. 5, the subject of the above drawing figures in an exploded view.
Figure 6:
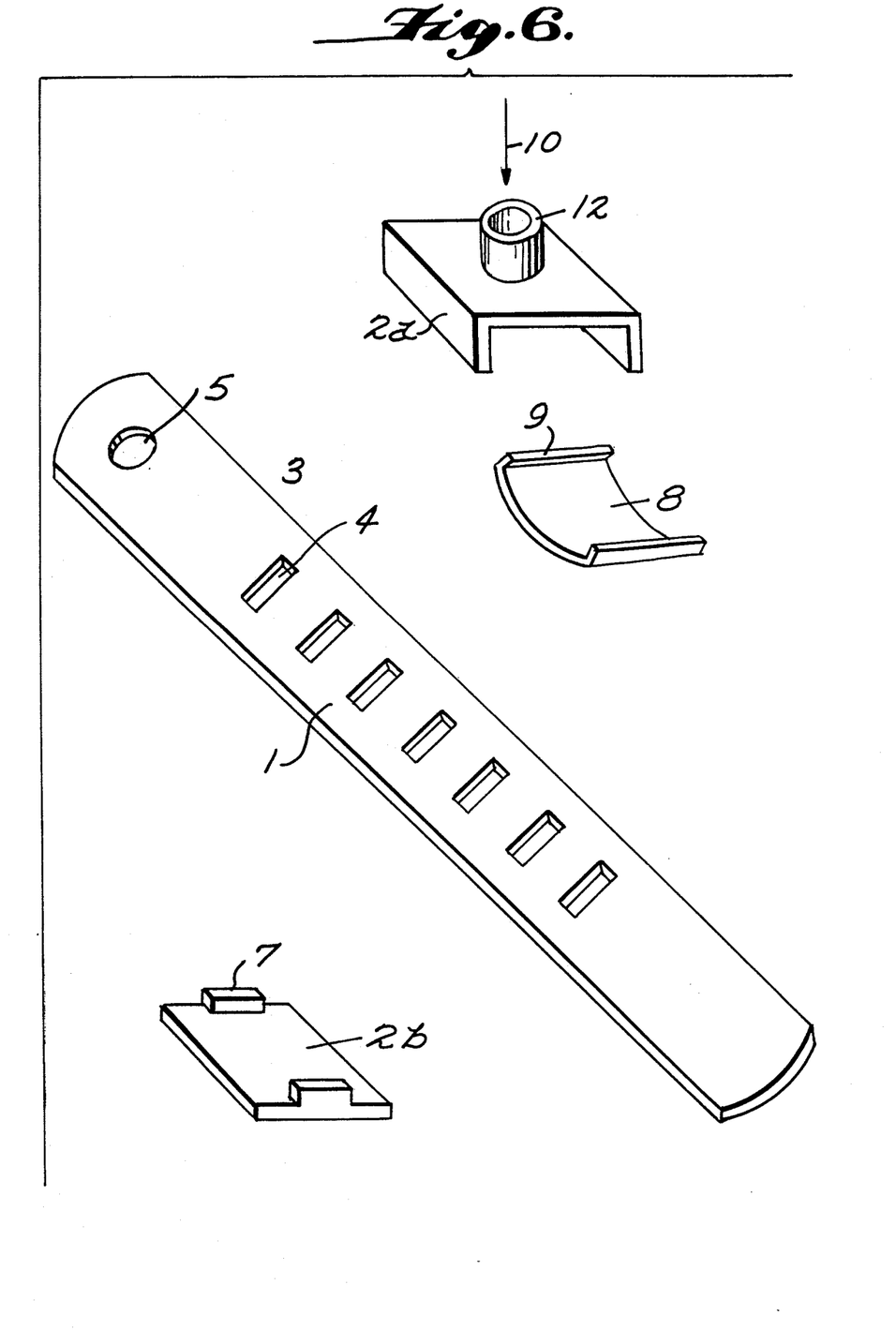
FIGS. 6–10, other embodiments of a device according to the invention, again in exploded views.
Figure 7:
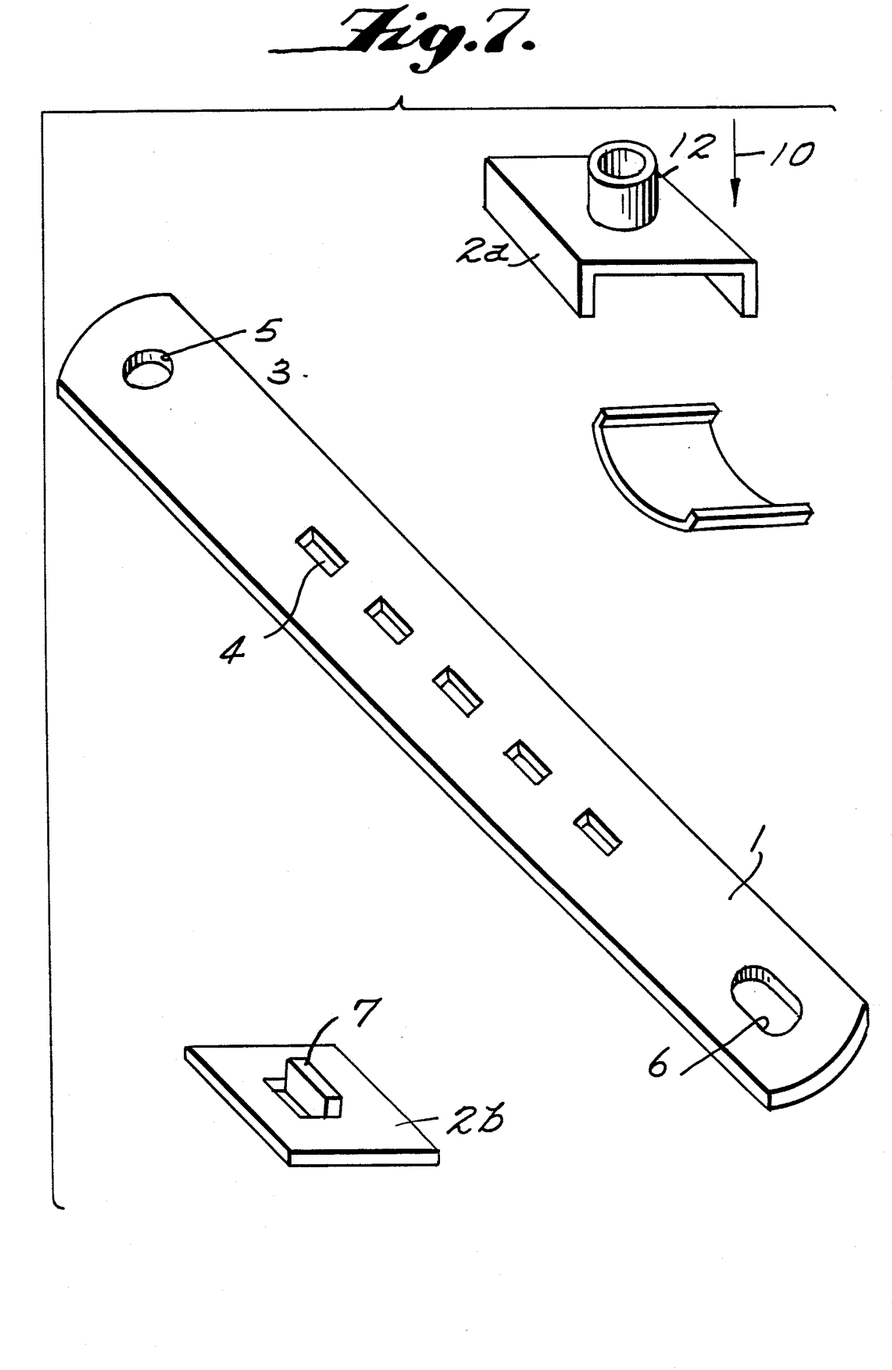
Figure 8:
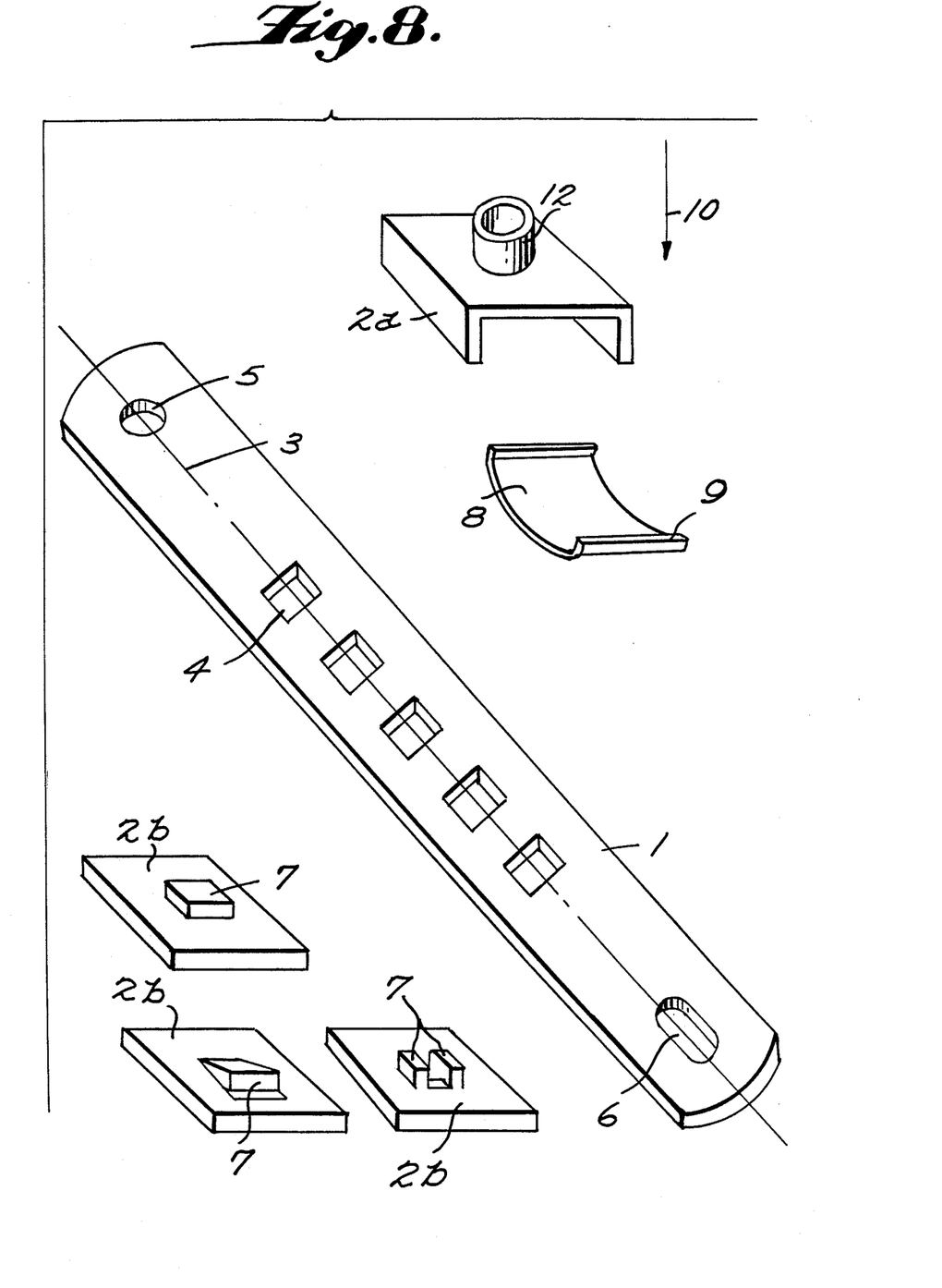

Thus it is apparent at a glance from FIG. 5 that only a few quite simple component parts are needed, namely the flat guide rail 1, the guide sleeve 2, optionally made of the upper part 2a and the lower part 2b, and the leaf spring 8. The engagement lugs 7 on the lower part 2b basically correspond in shape to the recesses 4, and with their height in the guide sleeve 2 they define the free cross section required for displacement on the guide rail 1.

Figure 9:
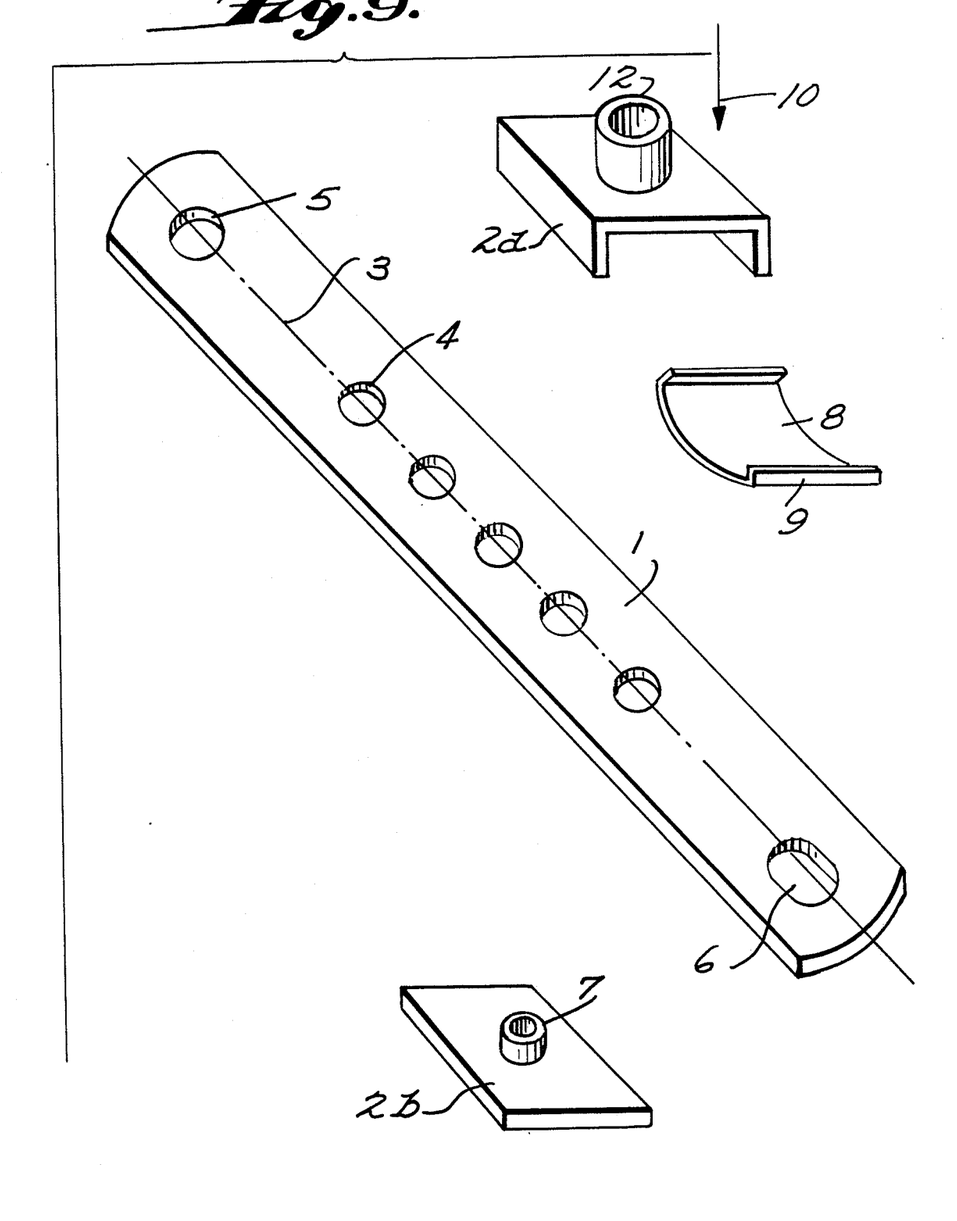

As the further FIGS. 6–9 show, the recesses 4 can also be provided in only a single line; in that case, they extend along the axis 3 of the guide rail 1. They may have a variety of shapes, but in particular are approximately square (FIG. 8) or round (FIG. 9). The engagement lugs 7 may be formed in various ways, for example by stamping, bending, beading, and the like. Rivets can also be used as engagement lugs, as can welded-in or pressure-welded bolts, and so forth.

Figure 10:
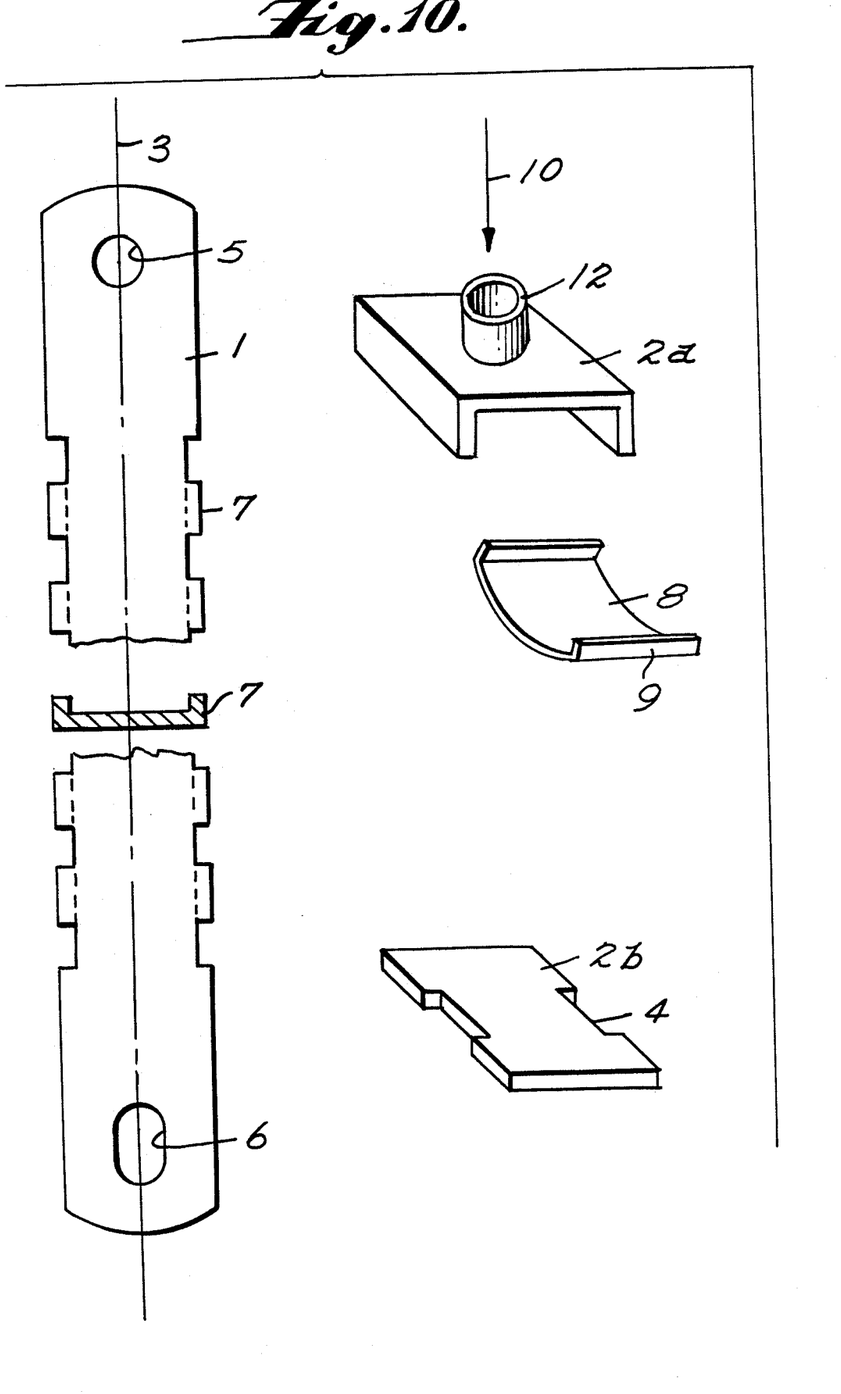

FIG. 10 is intended to show that the concept of the invention can also be realized in such a way that instead of engagement lugs 7, recesses 4 are provided on the rear surface of the guide sleeve 2. Correspondingly, engagement lugs 7 are then disposed on the guide rail 1, analogously to the recesses 4 of the foregoing exemplary embodiments. The mode of operation and use remains the same.

In closing, it should be noted that devices according to the invention have a variety of advantages. First, they have low structural height. Next, they are symmetrically designed and as a result can be used on both the left and right side of the vehicle, without any difference. They can have recesses and engagement lugs of many shapes as well as in greater numbers, so that form-locking engagement and load capacity can be optimized. Because the design is limited only to a few component parts, manufacture and assembly are now simpler and less expensive. Finally, the device also proves to be particularly simple and safe to operate.

I claim:

1. A device for incremental adjustment of the position of a securing point for a safety belt, comprising a guide rail and a guide sleeve displaceable on the guide rail, wherein engagement lugs on the one hand and corresponding recesses on the other are provided in such a way that the guide sleeve, for locking purposes, is movable into fixed engagement with the guide rail transverse to the actual displacement direction, said guide sleeve having a spring element that is disposed between the guide rail and the guide sleeve for retaining the guide sleeve in the locking position, said guide sleeve and said guide rail having one of said engagement lugs and recesses whereby said guide sleeve and guide rail are held in said fixed engagement by interengagement between said engagement lugs and recesses.

2. A device as defined by claim 1, characterized in that recesses are disposed on the axis of the guide rail.

3. A device as defined by claim 1, characterized in that the spring element is a wide leaf spring having folded-up ends.

4. The device as claimed in claim 1 wherein said guide rail has opposite edges and said edges are provided with spaced rectangular recesses for receiving said engagement lugs.

5. The device as claimed in claim 1 wherein said guide rail is provided on opposite edges thereof with spaced engagement lugs for cooperation with rectangular recesses provided on said guide sleeve.

6. The device as claimed in claim 1 wherein said guide rail has a predetermined thickness and said engagement lugs have a height approximately equal to said thickness.

7. The device as claimed in claim 1 wherein said guide sleeve has a first part having an outwardly facing surface bounded by two opposite edges and a second part including a second surface extending generally parallel to said first surface, said second part having said engagement lugs.

* * * * *